United States Patent [19]

Marshall et al.

[11] Patent Number: 5,567,500
[45] Date of Patent: Oct. 22, 1996

[54] COMPOSITE HONEYCOMB CORE STRUCTURE COMPRISING CELL WALLS CONSTRUCTED OF AT LEAST THREE UNIDIRECTIONAL FIBER LAYERS OR AT LEAST TWO UNIDIRECTIONAL FIBER LAYERS AND A RANDOM FIBER LAYER

[75] Inventors: Andrew C. Marshall, Walnut Creek; Michael L. Fellman, Benicia, both of Calif.

[73] Assignee: Speciality Cellular Products Company, Dublin, Calif.

[21] Appl. No.: 543,225

[22] Filed: Oct. 13, 1995

Related U.S. Application Data

[63] Continuation of Ser. No. 312,480, Sep. 26, 1994, which is a continuation of Ser. No. 250,644, May 27, 1994, abandoned, which is a division of Ser. No. 988,674, Dec. 10, 1992, abandoned, which is a continuation of Ser. No. 741,126, Aug. 7, 1991, abandoned.

[51] Int. Cl.$^6$ ................................. B32B 3/12; B32B 3/10
[52] U.S. Cl. ..................... 428/116; 428/118; 428/134; 428/137; 428/294; 428/302; 428/902
[58] Field of Search ........................... 428/116, 246, 428/298, 118, 134, 137, 294, 302, 902

[56] References Cited

U.S. PATENT DOCUMENTS 5,217,556  6/1993  Fell ......................................... 428/116

*Primary Examiner*—James D. Withers
*Attorney, Agent, or Firm*—Bielen, Peterson & Lampe

[57] ABSTRACT

A composite web structure utilizing a thin first layer of material having a plurality of structural fibers arranged to lie essentially in a unidirectional orientation. A thin second layer of material is positioned adjacent the first layer and includes a plurality of structural fibers. First and second layers are impregnated with a matrix material for binding fibers within the first and second layers and for binding the first and second layers together. The web may be formed into a composite structure such as a honeycomb core for fabrication into a panel.

7 Claims, 3 Drawing Sheets

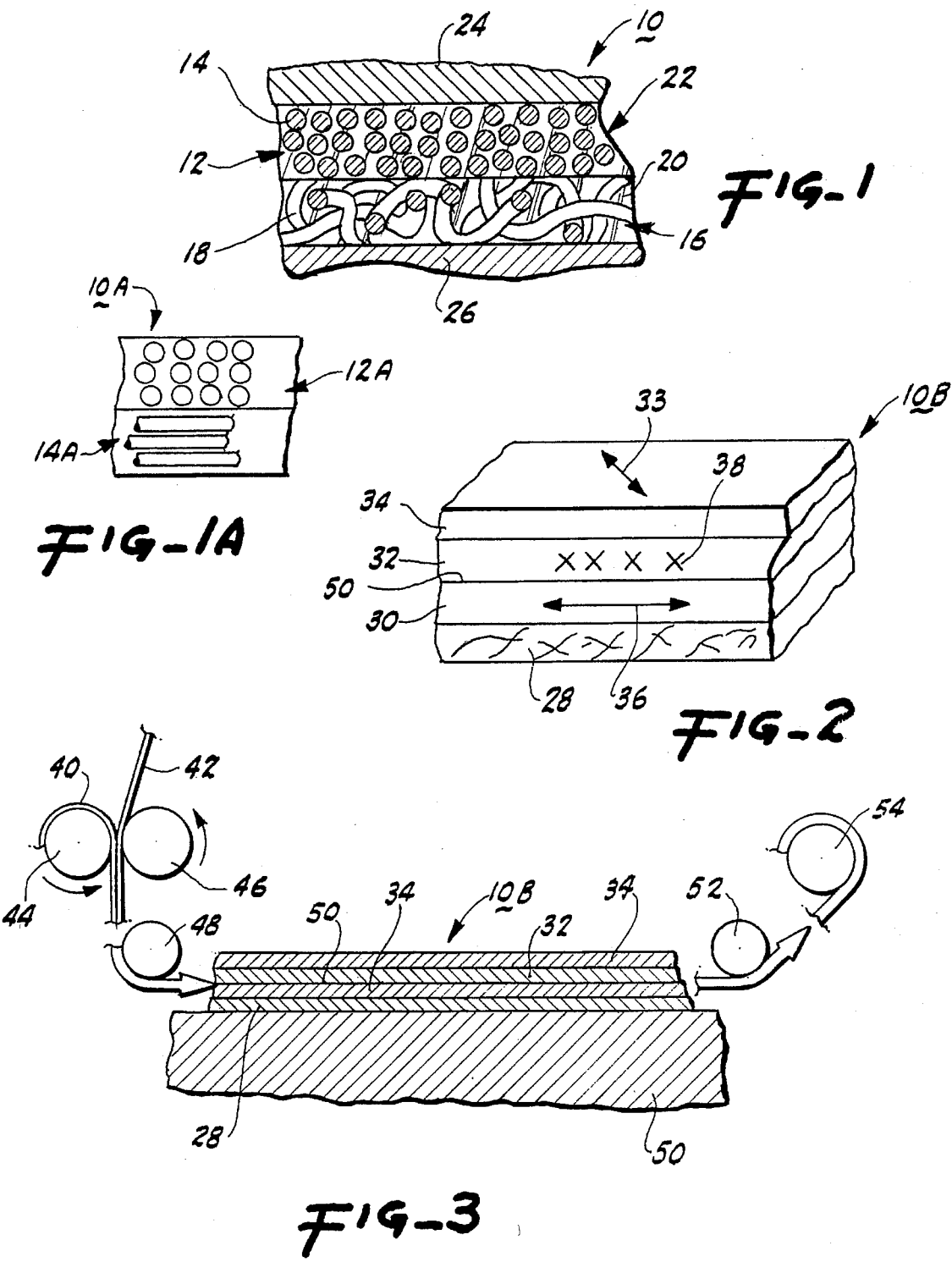

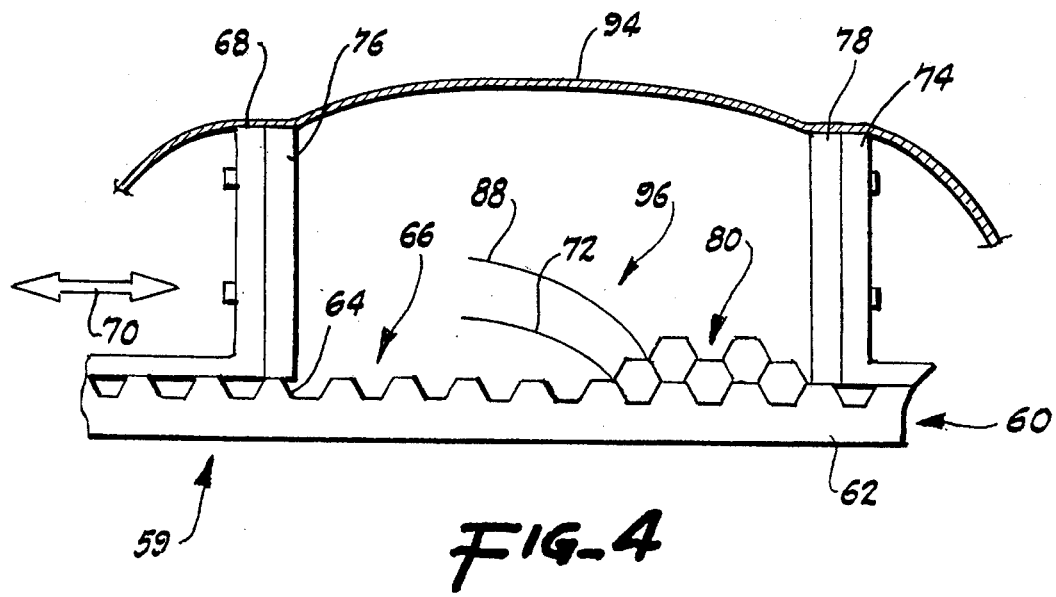
FIG._4
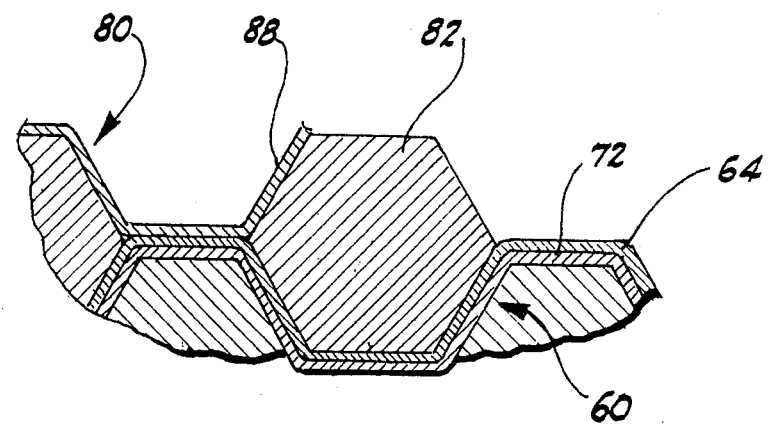
FIG._5
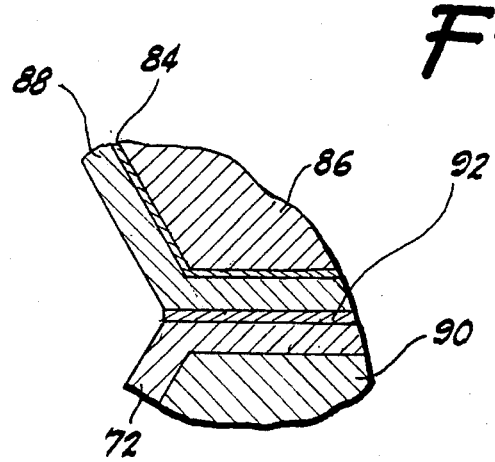
FIG._6

COMPOSITE HONEYCOMB CORE STRUCTURE COMPRISING CELL WALLS CONSTRUCTED OF AT LEAST THREE UNIDIRECTIONAL FIBER LAYERS OR AT LEAST TWO UNIDIRECTIONAL FIBER LAYERS AND A RANDOM FIBER LAYER

This is a continuation, of application Ser. No. 08/312,480, filed Sep. 26, 1994, which is a continuation of application Ser. No. 08/250,644, filed May 27, 1994, now abandoned, which is a Division of application Ser. No. 07/988,674 filed Dec. 10, 1992, now abandoned, which is a continuation of application Ser. No. 07/741,126, filed Aug. 7, 1994, now abandoned.

BACKGROUND OF THE INVENTION

The present invention relates to a novel web and composite structure formed therefrom.

Composites are generally an assembly of dissimilar materials that work together to perform a function only possible in the composite form. Generally, composites include a resin matrix with a fiber reinforcement material. "Advanced composites" generally refer to newer materials forming the resin matrix or the fiber reinforcements in which the fibers possess a Young's Modulus of greater than 12 million.

Fibers can be constructed of Kevlar®, carbon fiber, Nextel®, boron, or any other materials having a very small diameter and high strength and stiffness. Resins may typically consist of an epoxy, polycyanate, bismaleimide, and the like. The strength and stiffness of the resin matrix also affects the strength of the finished composite structure. For example, stronger resins such as epoxies usually yield a higher strength composite structure than lower strength resins such as polyester.

Structural fibers are generally formed into yarns or rovings which include a number of twisted or untwisted strands either plied together or formed in a continuous filament. In the past, these yarns have been woven into a cloth entailing the application of a sizing or lubricant to achieve this condition. After weaving, the lubricant is removed and a surface finish is applied either to prevent or promote the adhesion of resins which are later applied during the pre-impregnation or assembly process. In this regard, reference is made to U.S. Pat. No. 4,534,919 which discloses a carbon fiber tow suited for resin impregnation having disrupted parallel filaments.

Unidirectional tapes have been constructed of carbon fibers or other fibers in a dry fiber form or in a form pre-impregnated with a resin matrix. For example Y.L.A Inc. of Benicia, Calif. produces a single ply unidirectional tape under the designation XN 50A/RS-3. Such unidirectional tapes have been used in layup processes for the fabrication of sporting goods and aeronautical structures such as wing skins, solar arrays in satellites and the like. Lack of transverse integrity limits formation of core structures from existing unidirectional tapes, ie; they are delicate and prone to splitting along the side-by-side fibers. Thus, such unidirectional tapes are difficult to handle and process into a honeycomb structure.

Structural fibers may be formed into finished composite structures either by employing woven or non-woven web reinforcing material. For example, U.S. Pat. No. 5,013,514 proposes production of a hollow element utilizing woven or non-woven carbon fiber mats. U.S. Pat. No. 3,255,062 shows a method of manufacturing a reinforced honeycomb structure utilizing foam, plastic, or cardboard. U.S. Pat. No. 3,200,489 teaches a method of making a honeycomb core using stainless steel which is expanded from multiple foils or sheets which are bonded together at points.

U.S. Pat. Nos. 3,248,275 and 3,137,604 describe a honeycomb structure formed of resins impregnated in glass cloth. U.S. Pat. No. 4,563,321 reveals a method of producing a unitary curved structure having a honeycomb core which employs woven fiber glass material and an outer layer of chopped glass fibers.

The use of honeycomb core materials for constructing lightweight panels or sandwich structures is well established in the aeronautical and spacecraft fields. For example, in commercial aircraft, nearly all of the movable control surfaces, wing and tail leading and trailing edge fixed surfaces, doors, and interior cabin structures employ panels formed of honeycomb cores. Such prior art cores have typically been constructed of an aluminum or Aramid paper (known as Nomex®) honeycomb. Although more expensive than simple structures, the honeycomb core panel possess equal strength at higher stiffness, lower weight, and is resistant to higher natural vibration frequencies. Such resistance is very important when structural elements are employed in close proximity to jet and rocket engines. Reference is made in this regard to treatises entitled "Composite Basics" second edition by A Marshall; International Encyclopedia of Composites, Volume 1, pgs. 488–507, Lee; Handbook of Composites, chapter 21, G. Lubin; and a brochure entitled "Honeycomb, TSB 120" Hexcel Corp which describe honecomb cores in detail Moreover, the honeycomb core must have small enough cell sizes to provide stabilization of the facings against premature buckling. In addition, the core must be sufficiently tough and abuse resistant to enable the same to be easily handled in a fabrication shop.

Aramid honeycombs are used where high damage tolerance and abuse resistance is a criteria. However, Aramid honeycombs lack the shear and compressive strength of aluminum honeycombs.

Aluminum, the presently preferred core material for minimum weight primary structures in spacecraft and aircraft, also possesses problems in that using the same at one pound per cubic foot density provides ample strength for the primary loading of a structure, but results in a very fragile structure which is easily damaged when subjected to the normal manufacturing, assembling and testing procedures used in fabrication. In addition, aluminum cores do not provide a compatible coefficient of thermal expansion relative to the facing material which is normally a carbon fiber. As a result, changes in temperature result in the warpage of the structure. Such warpage can occur during the panel manufacturing process as a result of cool-down from the core-facing bonding temperature to room temperature, typically a 275 degree fahrenheit difference. Also, warpage occurs in outerspace if such a panel is employed as a spacecraft structure when the spacecraft moves from daylight to darkness and back again.

A lightweight, thin, web having unidirectional structural fibers for constructing lightweight honeycomb cores would be a great advance in the field of materials technology.

SUMMARY OF THE INVENTION

The present invention relates to a novel composite structure which is particularly useful in forming a honeycomb core.

The composite structure of the present invention utilizes a first layer of material having a plurality of structural fibers arranged to lie substantially unidirectionaly within the layer. In its preferred embodiment, the first layer of material is relatively thin, having a thickness of only several fibers. The first layer may be composed of fibers such as carbon fiber, Kevlar® fiber, polyethylene terapthalate fibers (known as Spectra®), and the like.

The composite structure also includes a second layer of material positioned adjacent the first layer which also includes a plurality of structural fibers. The structural fibers of the second layer may be in either random configuration, or unidirectional configuration and may consist of a material which is the same or different from the material of the structural fibers employed in the first layer. Where the fibers of the second layer are unidirectional, such fibers lie in a different direction than the fibers in the first layer, preferably at about 90° relative to the unidirectional fibers of the first layer.

The composite structure of the present invention also entails means for impregnating the first and second layers with a matrix which binds the fibers within the first and second layers. Binding would also essentially connect the first and second layers to one another to form a two-ply web or tape. Such means may include the use of a compatible resin material for pre-impregnating both layers of material.

It should be further noted that the composite structure described herein may also include one or more additional layers of material having a plurality of structural fibers arranged in a substantially unidirectional orientation. The direction of the fibers in each of the non-adjacent unidirectional layers may be coincident or non-coincident. In addition, the composition of the structural fibers in each of the unidirectional layers may be the same or different depending on the intended use of the composite structure. For example, a mixture of 75 million psi modulus carbon fibers and 100 million psi modulus carbon fibers may be mixed in a single layer.

Such multilayer pre-impregnated composite web may be formed into a honeycomb core. Further, the unidirectional fibers may be positioned within the honeycomb and oriented in a direction which permits side-by-side fibers to be located in the optimum direction to bear specific loads applied to the honeycomb core. The resulting density of such a honeycomb core is less than 2 pounds per cubic foot, and preferably, less than 1 pound per cubic foot. In addition, preliminary testing indicates that higher strength and stiffness is obtained at the same or lower densities than is obtained by honeycomb cores produced with woven fabrics employing identical fibers of aluminum foil.

The process for manufacturing such a honeycomb encompasses providing a base with a surface of geometrically predetermined facets for producing a particular honeycomb cell structure, eg; right regular hexagons, rectangles, circles and the like. Reference is made hereat to FIG. 21.8 of the treatise Handbook of Composites previously cited. The faceted surface is overlain with the prior described multiply web structure of the present invention having a first unidirectional layer and a second layer which may include fibers of random configuration, both layers being impregnated with resin material. A plurality of heat expansive mandrels are placed on top of the web structure over the recesses formed on the faceted surface of the base. Of course, the mandrels would be formed with a cross-sectional configuration matching the cell structure required on any particular honeycomb core. A second web or tape utilizing the composite structure of the present invention is placed over the mandrels. Successive layers of tape and interleaved mandrels are stacked to the desired width of the block or core. Sufficient heat and pressure are then applied to the multiple webs and mandrels to cure the block and for a composite structure. Pressure is either applied by a vacuum bag or through the stacking and restraining of the mandrels within the core forming apparatus. After cooling, the mandrels are removed from the multiple webs or tapes leaving a curved honeycomb core. It should be noted that the mandrels may be composed of a heat conducting material such a aluminum, copper, and the like, and may be coated with a material which prevents the mandrels from sticking to the honeycomb core. In addition, the mandrels may be composed of a material having a higher coefficient of thermal expansion (CTE) than the web material, which aids in the application of pressure to the core during the curing process.

Moreover, the unidirectional fibers would all be oriented relative to the thickness direction of the finished honeycomb core such that the optimum performance of the honeycomb core is realized.

It may be apparent that a novel and useful web for use in a novel composite structure has been described.

It is therefore an object of the present invention to provide a composite web which employs a first layer of unidirectional fibers and a second layer of structural fibers which are fused to the first layer by an impregnating resin, permitting a multi-ply tape formed to possess stability and workability in the formation of complex composite structures.

It is another object of the present invention to provide a composite web which may be formed into a honeycomb which possesses lower density than prior honeycombs formed of woven fabrics or aluminum, yet possesses usable strength and stiffness.

Another object of the present invention is to provide a composite web which may be formed into a honeycomb core which has a lower coefficient of thermal expansion than prior honeycombs formed from woven fibrics or metal foils.

A further object of the present invention is to provide a composite web which may be formed into a honeycomb core whose coefficient of thermal expansion may be set at a predetermined value.

Yet another object of the present invention is to provide a composite web which may be formed into a honeycomb core which is simple to customize for its intended use employing minimal tooling and, thus, reducing tooling costs.

A further object of the present invention is to provide a carbon fiber composite web which may be formed into a honeycomb core having a higher thermal conductivity per unit weight than prior art carbon fiber honeycombs.

Yet another object of the present invention is to provide a composite web which may formed into a honeycomb core which is easily processed into a panel having less suceptibility to warpage than prior art aluminum honeycomb core panels of similar density.

Another object of the present invention is to provide a composite web which may formed into honeycomb core structures having modest curvatures, including honeycomb core cell shapes known in the prior art.

Another object of the present invention is to provide composite web which may be formed into a honeycomb core that is resistant to natural vibration frequencies produced by jet and rocket engines.

A further object of the present invention is to provide a composite web or tape having at least three layers, including unidirectional fiber layers, to form composite structures.

The invention possesses other objects and advantages especially as concerns particular characteristics and features thereof which will become apparent as the specification continues.

BRIEF DESCRIPTION OF THE DRAWINGS

FIG. 1 is a schematic sectional view of the composite web of the present invention depicting unidirectionally oriented fibers in one layer and random fibers in an adjoining layer.

FIG. 1A is a schematic sectional view depicting a pair of tapes each having unidirectionally oriented fibers which are at different angles.

FIG. 2 is schematic sectional view depicting multiple layers each having unidirectionally oriented fibers in different directions.

FIG. 3 is a schematic view showing the process for manufacturing the composite web depicted in FIG. 1 with a portion enlarged and in section to emphasize layering relationships.

FIG. 4 is a side elevational view of an apparatus employed to make a honeycomb core from the composite web of the present invention.

FIG. 5 is an enlarged sectional view of a portion of FIG. 4 showing at least one mandrel employed in the apparatus of FIG. 4.

FIG. 6 is an enlarged sectional view of a portion of FIG. 4 emphasizing adjacent composite tapes or webs employed in the formation of a honeycomb structure.

Figure 6A:
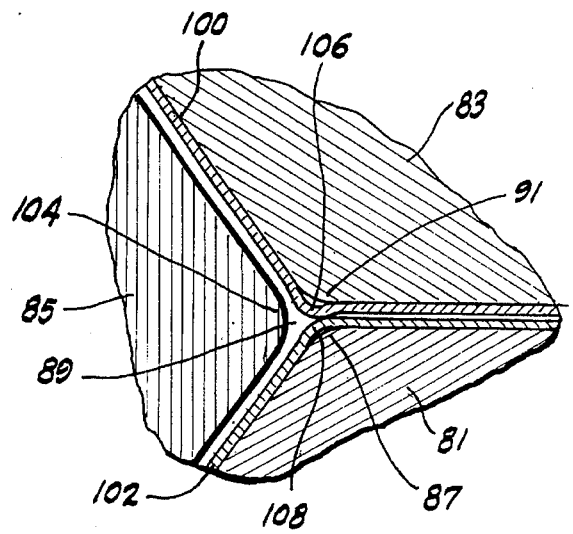
FIG. 6A is an enlarged sectional view of a typical trio of mandrels representing radiused corner portions of the same.

For a better understanding of the invention reference is made to the following detailed description of the preferred embodiments thereof which should be referenced to the hereinabove described drawings.

DESCRIPTION OF THE PREFERRED EMBODIMENTS

Various aspects of the invention revealed in the following detailed description of the preferred embodiments which should be taken in conjunction with the prior described drawings.

The invention as a whole is depicted in the drawings by reference character 10. The composite web or tape 10 includes as one of its elements a first layer 12 of material including a plurality of structural fibers 14 arranged to lie substantially unidirectionally within layer 10. Each of the plurality of fibers 14 in the present embodiment measures 5 to 25 microns in diameter. The overall thickness of layer 12 is approximately 25 microns and is considered to be "thin" in the field of composite structures. In general, a thickness of a web or tape less than 40 microns is considered to be "thin". Layer 12, as depicted in the drawings is approximately 15 microns in thickness. This translates into a Fiber Areal Weight (FAW) of less than 45 gms/m$^2$. The plurality of fibers 14 may be Aramid fibers, carbon fibers (having an elastic Modulus as high as one hundred thirty million psi), polyethylene terapthalate fibers, and many other high performance structural fibers. It should be noted that it is known that there is good electrical and heat conduction along plurality of fibers 14 when ultra high modulus carbon fibers are employed, having a modulus of greater than 75 million psi. Carbon fibers generally have a negative coefficient of thermal of expansion along the length of plurality of fibers 14. However, by mixing a variety of fibers, such as different carbon fibers, within first layer 12, the coefficient of thermal expansion can be rendered at about zero. Of course, substituting lower modulus carbon fibers or other fibers for carbon fibers would result in a positive thermal coefficient of expansion to varying degrees. The plurality of fibers 14 may be continuous or plied in structure, depending on the tow employed in its manufacture. A unidirectional tape pre-impregnated with a resin of the type depicted as first layer 12 is available under the designation XN 50A/RS-3, FAW 20 gm/m$^2$, resin %=53±3, from Y.L.A. Inc. in Uenicia, Calif.

Adjacent first thin layer 12 is second thin layer 16 which includes a plurality of structural fibers 14, depicted in FIG. 1, in random configuration. Plurality of random fibers 18 may be composed of structural fibers such as those recited in conjunction with first layer 12. However, the fibers in second layer 16 may be the same or different than the fibers used in first layer 12. The width of second layer 16 in the embodiment described is approximately 15 microns.

Resin matrix 20 transfers the load from one fiber to the next within plurality of fibers 14 and 18. In addition, resin matrix 20 serves to contain plurality of fibers 14 and 18, and to connect first and second layers 12 and 16 together within web structure 10. In the formation of web structure 10, resin matrix 20 initially found in first layer 12, flows into layer 14 by the application of heat. On the other hand, resin 20 may initially be used in the second layer 16 and be caused to flow in the opposite direction toward the first layer 12. Resin matrix 20 may be composed of any of the polymers of epoxy, polycyanate, bismaleimide and the like. When plurality of fibers 14 and 18 are carbon fibers, a polycyanate resin suffices in this regard. For example, a toughened polycyanate resin designated RS-3 and sold by Y.L.A. Inc. of Benicia, Calif. may be used. Release papers 24 and 26 protect composite structure 22 and facilitate the handling of the same. Of course, release papers 24 and 26 are removed prior to use of web structure 10, which will be described hereinafter. FIG. 1A depicts a web 10A having first and second layers 12A and 14A, each composed of unidirectional fibers which are oriented at 90 degrees to one another.

With reference to FIG. 2, it may be observed that composite web 10B is described utilizing a mat layer 28 and unidirectional layers 30, 32, and 34. Of course, a resin matrix, such as resin matrix 20, is employed in web structure 10B to bind the four layers together and carry the load from one fiber to the next. It should be noted that unidirectional layer 30 possesses fibers oriented along unidirectional arrow 36. In contrast, layer 32 includes unidirectional fibers oriented perpendicularly to the plane of the drawing page, ie: orthogonally relative to the direction of unidirectional fibers in layer 30, denoted by a multiplicity of "x's". Finally, layer 34 includes unidirectional fibers at approximately 45 degrees to the unidirectional fibers found in layers 30 and 32, directional arrow 33.

With reference to FIG. 3, it may be seen that composite web 10B may be formed by bringing together tapes 40 and 42. Tape 40 consists of layers 28 and 30 while tape 42 includes unidirectional layers 32 and 34. The tapes 40 and 42 pass through a pair of hot nip rollers 44 and 46 which initiate the flow of resin between tapes 40 and 42 to fuse or connect the same at interface 50, FIGS. 2 and 3. The fused tapes 40 and 42 pass over guide roller 48 and onto chill plate 50 which stabilizes the flow of the resin matrix within composite web 10B. Guide roller 52 directs composite web 10B onto takeup roller 54 for use. It should be noted that composite web 10B may also include release papers such as release paper layers 24 and 26 shown with respect to composite web 10.

Figure 7:
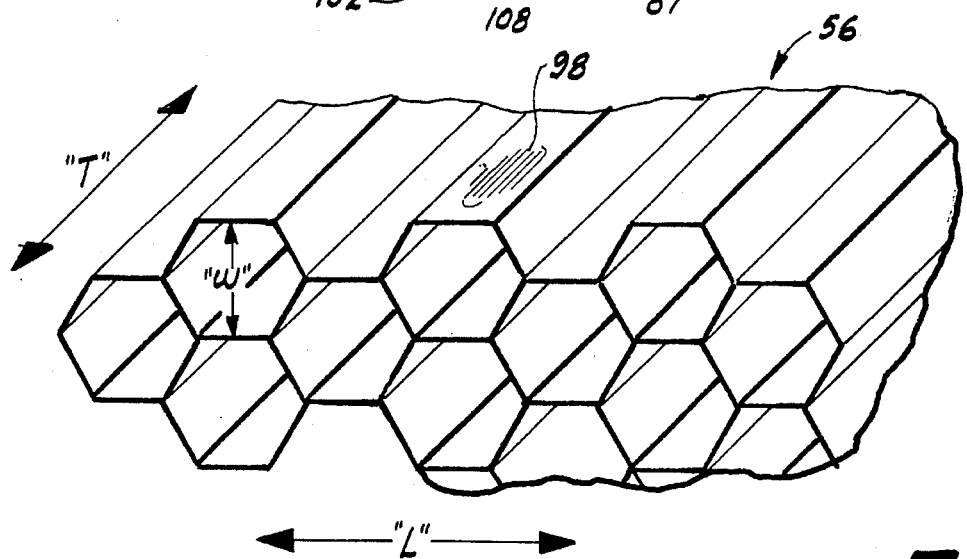
FIG. 7 is a schematic isometric view depicting the orientation of the unidirectional fibers in a honeycomb block built with the apparatus of FIG. 4 and showing the conventional orientation nomenclature.
Figure 8:
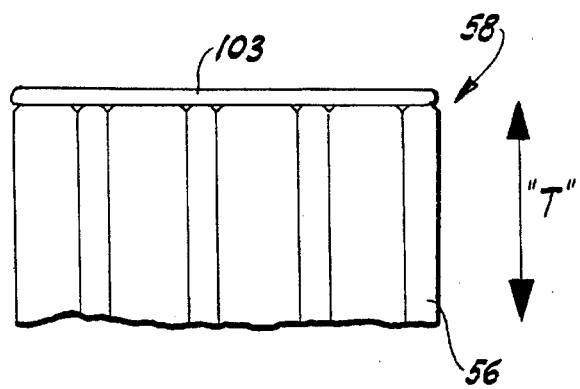
FIG. 8 is a partial side elevational view of a honeycomb structure formed by composite material of the present invention sandwiched to a facing to form a panel.

Referring now to FIGS. 4–6, composite web 10 may be formed into a honeycomb, such as that depicted by honeycomb 56 in FIG. 7, for use in panel structures such as panel 58 depicted in FIG. 8. Turning now to FIG. 4 apparatus 59 is depicted for producing honeycomb core 56. Apparatus 59 utilizes a base plate 60 having a bottom surface 62 which rests on a platform or ground supported structure. The base plate also includes an upper surface 64 which may be coated by a non-stick material such as Teflon. Base plate surface 64 is formed with a plurality of peaks and valleys, or other contours, determining the cell shape and size of the core to be manufactured. In the embodiment shown in FIG. 4, upper surface 64 possesses an angular configuration of half of the form of a right regular hexagon. Fence 68 is movable according to directional arrow 70 and determines the length of the honeycomb structure 56 to be manufactured. A first web or tape 72, which may comprise the composite structure 10, is placed across upper surface 64 of base 60, beginning at fixed fence 74 and extending to movable fence 68. Plates 76 and 78 attach to fences 70 and 74, respectively, and determine the height of the block or core 56 to be constructed. It should be observed that the unidirectional fibers of composite structure 10 are oriented perpendicular to the page of the drawings in FIG. 4.

A plurality of mandrels 80 are laid in the recesses along surface 64 of base plate 60. Each mandrel such as mandrel 82, FIG. 5, accommodates the thickness of composite tape 72 which is pressed beneath mandrel 82, and is sized to determine the cell size of honecomb core 56. Plurality of mandrels 80 are formed of heat conducting material such as aluminum, titanium, steel and the like. Each mandrel of plurality of mandrels 80 may be coated with a layer 84 of non-sticking material such as Teflon, shown with respect to mandrel 86 on FIG. 6. Second tape 88, FIG. 4, is then placed over the first row of mandrels occupying the valleys or recesses found in upper surface 64 of plate 60. Tape 88 may have the same structure as tape 72. Plurality of mandrels 80 would include mandrels such as mandrel 86 that overlies the top of tape 88, thus, pressing tapes 72 and 88 together at peak 90, FIG. 6 of upper surface 64 or at the top of another mandrel of plurality of mandrels 80. It should be observed that adhesive 92 can be placed between tapes 72 and 88 in certain types of cores requiring adhesion at this point, FIG. 6. Trio of unexpanded mandrels 81, 83, and 85, FIG. 6A each include radiused or curved corners 87, 89, and 91 which permit the high modulus fibers within the webs or tapes 100 and 102 to accumulate in the void 104 at the intersection of mandrels 81, 83 and 85. Bends 106 and 108 of tapes 100 and 102 represent such accumulation. This accumulation prevents the formation of wrinkles in the webs 100 and 102 which weakens the eventual honeycomb structure 56. Also, such radiused corners allow close conformance of the fibers to the corner of each mandrel without breakage of such fibers, thereat.

Vacuum bag 94, FIG. 4, is then placed over the built-up structure constituting a plurality of tapes 96 and a plurality of mandrels 80 to a height of the desired width of finished core 56. Pressure may also be applied by clamping the assembled tapes, and mandrels together and heating this clamped assembly such that the mandrels, expanding with the application of heat, exert the necessary pressure on the plurality of tapes 90. A negative pressure of between 8 and 14 psig is applied to vacuum bag 94 and the entire apparatus structure 59, plurality of tapes 96, and plurality of mandrels 80 is placed in an oven for several hours at a curing temperature appropriate to the resin 20 used. The structure of FIG. 4 is then removed from the oven and allowed to cool down to room temperature. Plurality of mandrels 80 are then removed leaving the constructed honeycomb core 56. Further cooling may be necessary to achieve complete separation of mandrels 80 from core 56. Additional resin may be dip coated on the surface of honeycomb core 56, as necessary followed by additional heat curing. With reference to FIG. 7, it should be noted that "W" "T" and "L" refer to the width, thickness and length dimensions of core 56, respectively. It should be realized, that the orientation of the unidirectional fibers in this example are aligned in the thickness direction ("T") shown by representative patch 98. A sandwich facing 100 may be applied to each side of honeycomb core 56 to form a panel 58 as shown in FIG. 8. The thickness dimension is also depicted in FIG. 8 for the sake of clarity.

The following examples are presented to further detail the invention sought for patenting, but should not be deemed to be restrictive of such invention.

EXAMPLE I

Employing apparatus 59, depicted in FIG. 4, honeycomb blocks were constructed utilizing the composite web depicted in FIG. 1 consisting of a first layer of a unidirectional tape, 33 grams FAW, 50–55% resin, XN-50A pitch carbon fiber, 75 mpsi modulus, available from Y.L.A. of Benecia, Calif. The second layer included a random mat of carbon fiber 8000015, 100% PAN based carbon of the type available from International Paper Co. of Tuxedo N.Y. Blocks were also constructed with the random mat second layer alone, 17 gram FAW, available from the same source. Apparatus 59 and the uncured blocks were placed in vacuum bag 94 under a negative pressure. The blocks were heated at 350° F. for (3) hours in an oven, removed, and allowed to cool down to room temperature overnight. After removing the mandrels following cool down, the blocks constructed of the composite web 10 of FIG. 1 and radom mat alone were trimmed with a circular saw, weighed, and measured to determine density. The following table represents density measurements of identified blocks prepared according to Example I without subsequent resin dip treatment:

TABLE 1

| BLOCK | DENSITY (pounds per cubic foot) |
| --- | --- |
| 1. RS-3 Resin System, first ply of 33 gm FAW of XN-50A (Nippon Petro Chem) at 0°; second ply of 17 FAW 33 mm CF at random orientation (Int Paper) | 1.2 |
| 2. RS-3 Resin System, first ply of 25 gm FAW of T-300 (Toray) at 0°; second ply of 17 FAW, 33 mm CF at random orientation (Int. Paper) | 1.0 |
| 3. RS-3 Resin System, one ply only of 17 FAW, 33 mm CF 33 mm at random orientation (Int. Paper) | 0.5 |
| 4. RS-3 Resin System, first ply of 10 gm FAW of T-300 (Toray) at 0°; second ply of 17 FAW, 33 mm CF at random configuration | 0.8 |

The blocks of Table 1 were treated using a solution of 10% RS-3 resin and 90% methylethylketone. After removal from the solution, the blocks were cured in an oven at 350 degrees fahrenheit for three hours, cooled, and reweighed.

The following table represents the density measurements of the blocks.

TABLE 2

| BLOCK | DENSITY (pounds per cubic foot) |
|---|---|
| 1. RS-3 Resin System, first ply of 33 gm FAW of XN-50A (Nippon Petro Chem) at 0°; second ply of 17 FAW 33 mm CF at random orientation (Int Paper) | 1.3 |
| 2. RS-3 Resin System, first ply of 25 gm FAW of T-300 (Toray) at 0°; second ply of 17 FAW, 33 mm CF at random orientation (Int. Paper) | 1.1 |
| 3. RS-3 Resin System, one ply only of 17 FAW, 33 mm CF at random orientation (Int. Paper) | 0.6 |
| 4. RS-3 Resin System, first ply of 10 gm FAW of T-300 (Toray) at 0°; second ply of 17 FAW, 33 mm CF at random configuration | .85 |

As may be observed, each block added approximately 0.1 pound per cubic foot to its density measurement by this dipping and curing process.

Preliminary compressive strength tests indicates that blocks 1 and 2 of Tables 1 and 2 exhibits substantially highly compressive strength over 1 lb. aluminum honeycombs currently available in satellite structures.

While in foregoing, embodiments of the present invention have been set forth in considerable detail for the purposes of making a complete disclosure of the invention, it may may be made in such detail without departing from the spirit and principles of the invention.

What is claimed is:

1. A composite honeycomb core structure comprising:
   a. a first layer of material containing a plurality of structural fibers arranged to lie substantially unidirectionally within said layer;
   b. a second layer material positioned adjacent said first layer, said second layer containing a plurality of structural fibers in either random or unidirectional configuration;
   c. a third layer of material adjacent said first layer, said third layer of material containing a plurality of structural fibers arranged to lie substantially unidirectionally within said third layer; and
   d. an impregnating material for forming a matrix connecting said first and second layers binding said fibers within said first and second layers, said first, second, and third layers being formed into a honeycomb core, said first, second, and third fiber-containing layers of material forming the cell walls of said honeycomb core.

2. The composite honeycomb core structure of claim 1 in which said unidirectional fibers of said first layer orient in a different direction from said fibers of said third layer.

3. The composite honeycomb structure of claim 1 in which said structural fibers of said first layer are of a different material from said structural fibers of said third layer.

4. The composite honeycomb structure of claim 1 in which said structural fibers of said first layer are carbon fibers.

5. The composite honeycomb structure of claim 1 in which said first, second, and third layers formed into said honeycomb core having a density of less than 2.0 pounds per cubic foot and a Young's modulus of greater than 18 million pounds per cubic foot.

6. The composite structure of claim 1 in which said structural fibers of said second layer of material lie in random orientation.

7. The composite structure of claim 1 in which said structural fibers of said second layer are arranged to lie substantially unidirectionally therewithin in a different direction than said unidirectional fibers of said first layer.

* * * * *